United States Patent
Ngai et al.

(10) Patent No.: US 9,876,428 B2
(45) Date of Patent: Jan. 23, 2018

(54) CIRCUITS, DEVICES AND METHODS RELATED TO INTERNAL SUPPLY FOR VOLTAGE REGULATORS

(71) Applicant: SKYWORKS SOLUTIONS, INC., Woburn, MA (US)

(72) Inventors: Chak S. Ngai, Campbell, CA (US); George A. Hariman, Sunnyvale, CA (US); Daniel Chang, Mountain View, CA (US); Roger Allen Smullen, Saratoga, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/154,371

(22) Filed: May 13, 2016

(65) Prior Publication Data

US 2016/0336859 A1    Nov. 17, 2016

Related U.S. Application Data

(60) Provisional application No. 62/161,115, filed on May 13, 2015.

(51) Int. Cl.
*H02M 3/158*    (2006.01)
*H02M 1/00*    (2006.01)

(52) U.S. Cl.
CPC .... *H02M 3/158* (2013.01); *H02M 2001/0006* (2013.01)

(58) Field of Classification Search
CPC . H02M 3/158; H02M 2001/0006; H02H 7/10
See application file for complete search history.

(56) References Cited

U.S. PATENT DOCUMENTS

| | | | | |
|---|---|---|---|---|
| 7,235,759 B2 * | 6/2007 | Geissler | ............... | B23K 9/1006 219/130.1 |
| 7,245,513 B2 * | 7/2007 | Watanabe | ........... | H01L 27/0705 257/E27.029 |
| 7,911,189 B2 * | 3/2011 | Seberger | ............... | H02M 3/155 307/39 |
| 9,041,377 B2 * | 5/2015 | Wang | .................... | H02M 3/158 323/283 |
| 2007/0210775 A1 * | 9/2007 | Bothra | .................. | H02M 3/158 323/283 |
| 2010/0001704 A1 * | 1/2010 | Williams | .............. | H02M 3/158 323/283 |
| 2010/0117611 A1 * | 5/2010 | Yamada | ................ | H02M 3/158 323/282 |
| 2010/0193487 A1 * | 8/2010 | Geissler | ............... | B23K 9/1006 219/130.1 |
| 2011/0215862 A1 * | 9/2011 | La Rosa | .................. | G05F 3/24 327/541 |

(Continued)

*Primary Examiner* — Jean B Corrielus
(74) *Attorney, Agent, or Firm* — Chang & Hale LLP

(57) ABSTRACT

A voltage regulator device is disclosed, comprising a first pin and a second pin, a regulator circuit implemented between the first pin and the second pin, one or more internal blocks configured to be powered through a supply node to facilitate operation of the regulator circuit and an internal supply circuit coupled to the first pin, the second pin, and the supply node, the internal supply circuit configured to provide a supply voltage to the supply node from either or both of the first and second pins.

20 Claims, 12 Drawing Sheets

(56) References Cited

U.S. PATENT DOCUMENTS

2015/0130533 A1* 5/2015 Jeon .................. H02J 9/061
327/540
2015/0326119 A1* 11/2015 Hung .................. H02M 3/157
327/540

* cited by examiner

CIRCUITS, DEVICES AND METHODS RELATED TO INTERNAL SUPPLY FOR VOLTAGE REGULATORS

CROSS-REFERENCE TO RELATED APPLICATION(S)

This application claims priority to U.S. Provisional Application No. 62/161,115 filed May 13, 2015, entitled CIRCUITS, DEVICES AND METHODS RELATED TO INTERNAL SUPPLY FOR VOLTAGE REGULATORS, the disclosure of which is hereby expressly incorporated by reference herein in its entirety.

BACKGROUND

Field

The present disclosure relates to circuit designs for voltage regulation systems.

Description of the Related Art

As computer chips and chip packages decrease in size, the number of external pins, pads, bumps or other contacts can also decrease due to space and routing constraints. For example, a 20% decrease in surface area of a face of a flip chip package results in at least a 20% decrease in the number of bumps that can be placed on that face. Consequently, a need exists to provide functional circuit blocks, such as voltage regulation systems, that can function effectively with fewer external pins, pads or other contacts.

SUMMARY

According to some implementations, the present disclosure relates to a voltage regulator device that includes a first pin and a second pin, with a regulator circuit implemented between the first pin and the second pin. The voltage regulator device includes one or more internal blocks configured to be powered through a supply node to facilitate operation of the regulator circuit and an internal supply circuit coupled to the first pin, the second pin, and the supply node. In some implementations, the internal supply circuit is configured to provide a supply voltage to the supply node from either or both of the first and second pins.

In some embodiments, the first pin of the voltage regulator device includes a switch (SW) pin, and the second pin includes an output (OUT) pin. In some embodiments, the regulator circuit of the voltage regulator device includes a first switch implemented between a node associated with the SW pin and ground, and a second switch implemented between the node associated with the SW pin and a node associated with the OUT pin.

In some embodiments, the SW pin is configured to be connected to an input voltage VIN through an inductance L. In some embodiments, the inductance L includes an inductor that is substantially external to the voltage regulator device.

In some embodiments, the input voltage of the voltage regulator device includes a battery voltage VBAT. In some embodiments, the OUT pin of the voltage regulator device is configured to be coupled to ground through a capacitance C. In some embodiments, the capacitance C includes a capacitor that is substantially external to the voltage regulator device.

In some embodiments, the internal supply circuit of the voltage regulator device includes a switchable connection configured to connect the supply node to the node associated with the SW pin or the node associated with the OUT pin. In some embodiments, the switchable connection of the voltage regulator device includes a single-pole-double-throw (SPDT) switch having the pole connected to the supply node and the two throws connected to the nodes associated with the SW and OUT pins.

In some embodiments, the switchable connection is configured to connect the node associated with the SW pin with the supply node prior to and during a phase where an output voltage VOUT is being pre-charged. In some embodiments, the switchable connection is further configured to connect the node associated with the OUT pin with the supply node when the output voltage VOUT reaches a value that is substantially at an input voltage VIN at the SW pin.

In some embodiments, the voltage regulator device is configured as a boost regulator. In some embodiments, the input voltage VIN is approximately equal to a battery voltage VBAT.

In some embodiments, the transition of the switchable connection of the voltage regulator device, from the node associated with the SW pin to the node associated with the OUT pin is configured to occur at or near commencement of a switched mode operation to boost the value of VOUT.

In some embodiments, the internal supply circuit of the voltage regulator device further includes a clamp circuit configured to reduce the value of a voltage provided to the supply node if the voltage exceeds an upper limit of a desired range. In some embodiments, the upper limit is lower than a fully-boosted value of VOUT.

In some embodiments, the voltage regulator device is substantially free of a separate input supply (IN) pin for supplying power to the supply node of the one or more internal blocks.

In some embodiments, a method for regulating voltage includes providing a regulator circuit between a first pin and a second pin, operating the regulator circuit with one or more internal blocks powered through a supply node and powering the one or more internal blocks by supplying voltage from either or both of the first and second pins to the supply node. In some embodiments, the powering of the one or more internal blocks is achieved substantially without use of a separate input supply (IN) pin.

In some embodiments, a voltage regulator die includes a semiconductor substrate having a first pin and a second pin implemented thereon, a regulator circuit implemented on the semiconductor substrate between the first pin and the second pin, one or more internal blocks implemented on the semiconductor substrate, the one or more internal blocks configured to be powered through a supply node to facilitate operation of the regulator circuit. In some embodiments, the voltage regulator die further includes an internal supply circuit implemented on the semiconductor substrate and coupled to the first pin, the second pin, and the supply node, the internal supply circuit configured to provide a supply voltage to the supply node from either or both of the first and second pins.

In some embodiments, an electronic module includes a packaging substrate configured to receive a plurality of components, and a voltage regulator device mounted on the packaging substrate, the voltage regulator device including a regulator circuit implemented between a first pin and a second pin, the voltage regulator device further including one or more internal blocks configured to be powered through a supply node to facilitate operation of the voltage regulator device, the voltage regulator device further including an internal supply circuit coupled to the first pin, the second pin, and the supply node, the internal supply circuit configured to provide a supply voltage to the supply node from either or both of the first and second pins.

In some embodiments, the electronic module is a power management module. In some embodiments, the power management module is configured to manage power in a wireless device. In some embodiments, the voltage regulator device of the electronic module has one or more properties of a voltage regulator device, as described herein.

In some embodiments, a wireless device includes a transceiver, a power amplifier (PA) configured to amplify a transmit (Tx) radio-frequency signal from the transceiver, a low-noise amplifier (LNA) configured to amplify a receive (Rx) RF signal for processing by the transceiver, an antenna switch module (ASM) configured to route the Tx RF signal and the Rx RF signal, and a power management module configured to manage power associated with at least some of the transceiver, the PA, the LNA, and the ASM. In some embodiments, the power management module includes a voltage regulator device having a regulator circuit implemented between a first pin and a second pin, the voltage regulator device further including one or more internal blocks configured to be powered through a supply node to facilitate operation of the regulator circuit, the voltage regulator device further including an internal supply circuit coupled to the first pin, the second pin, and the supply node, the internal supply circuit configured to provide a supply voltage to the supply node from either or both of the first and second pins.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
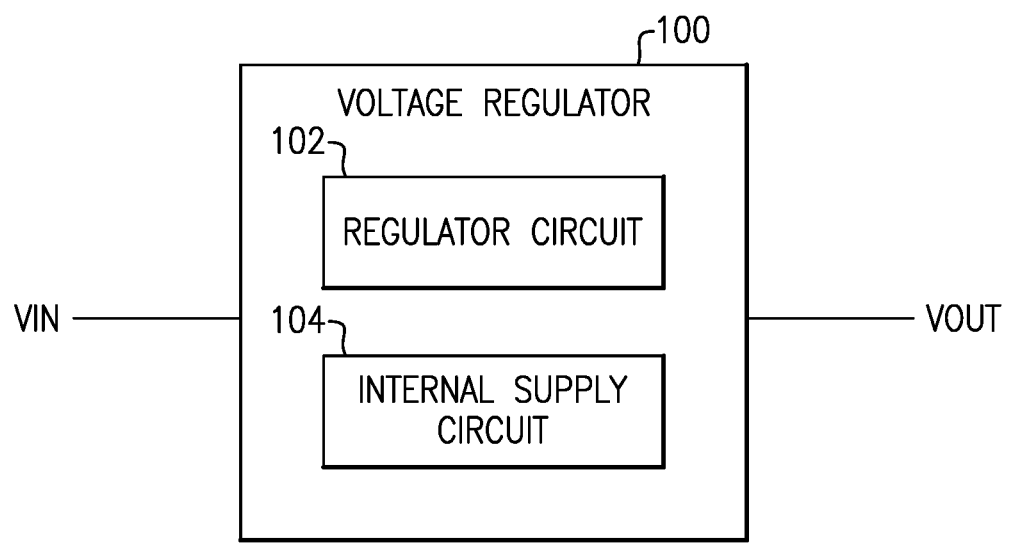
FIG. 1 shows a block diagram of a voltage regulator having an internal supply circuit.

FIG. 1 shows a block diagram of a voltage regulator device 100 having a regulator circuit 102 and an internal supply circuit 104. It will be understood that the regulator circuit 102 may or may not include one or more circuit elements external to the voltage regulator device 100. For example, elements such as an inductor and a capacitor can be implemented external to the voltage regulator device 100, and be part of and/or facilitate functionalities associated with the regulator circuit 102.

In some embodiments, the voltage regulator device 100 of FIG. 1 can be implemented as a packaged device such as a die or a module. Accordingly, in some embodiments, the internal supply circuit 104 can be implemented substantially within such a packaged device. However, it will be understood that one or more features of the present disclosure can also be implemented where some of the internal supply circuit 104 is implemented outside of such a packaged device.

In many packaged electronic devices, including devices such as voltage regulator devices, electrical input/output (I/O) of signals, power, etc. are commonly facilitated by pins. Such pins can include, for example, pin structures or bond pads for mating with corresponding electrical contact features on a substrate such as a packaging substrate or a circuit board. Such pins can also include, for example, bond pads for formation of wirebonds and flip chip bumps or solder balls.

Figure 2:
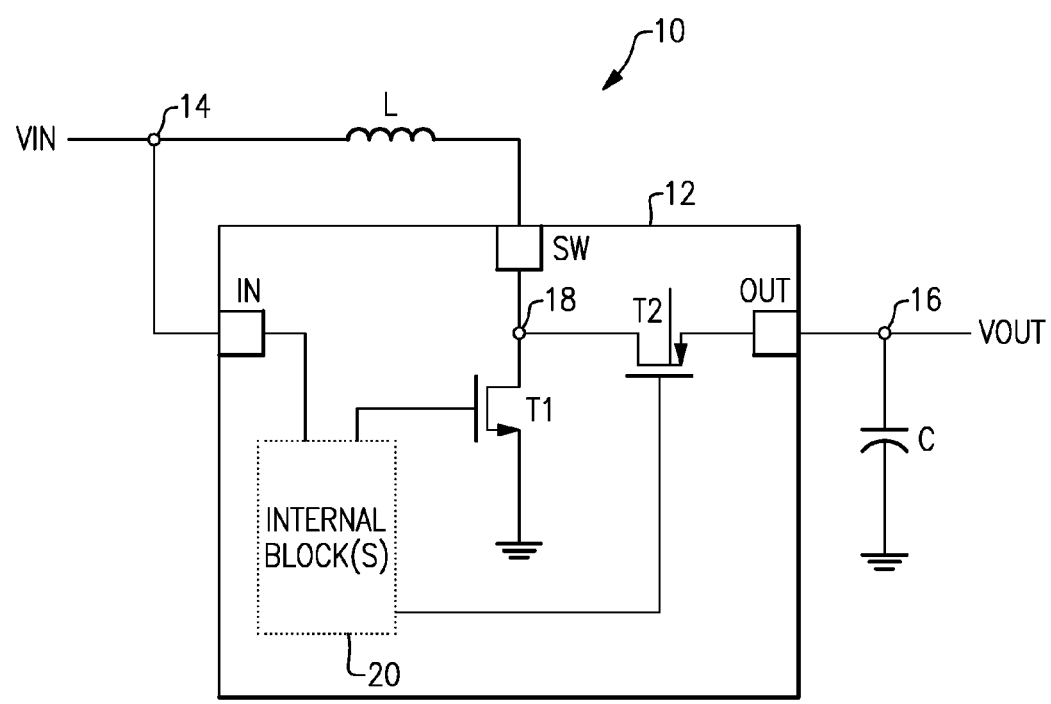
FIG. 2 shows a circuit diagram of a voltage regulator having an input pin for supplying voltage to one or more internal blocks.

FIG. 2 shows an example of a voltage conversion circuit 10 configured to receive an input voltage VIN at an input node 14 and generate a converted output voltage VOUT at an output node 16. Such a converted output voltage VOUT can be, for example, a boosted voltage output. In such an example context, the voltage conversion circuit 10 can include an inductance L implemented between the input node 14 and ground through a first transistor T1. In the example shown, the inductance L (e.g., an inductor) is depicted as being implemented external to a boost regulator device 12, however it will be understood that some or all of such an inductance may be within the boost regulator device 12. As is generally understood, when the boost regulator device 12 is operated in a switched mode, the inductance L can be charged during a turn-on time (e.g., T1 turned ON), and discharged during a turn-off time (e.g., T1 turned OFF).

A capacitance C (e.g., a capacitor) is shown to be implemented between a node 18 (between the inductance L and the first transistor T1) and ground through a second transistor T2. In the example shown, the capacitance C is depicted as being implemented external to a boost regulator device 12; however, it will be understood that some or all of such capacitance may be within the boost regulator device 12. As is generally understood, such a capacitance C can be utilized to facilitate a stable output of the output voltage VOUT.

As is generally understood, the first and second transistors T1 and T2 can be driven to yield the foregoing output voltage VOUT. For example, during a charging process, a first driving signal can turn the first transistor T1 ON to yield a conducting path between the inductance L and the ground to produce an inductive current. During such a time, a second driving signal can turn the second transistor T2 OFF to yield an open circuit between the node 18 and an output node 16. Assuming that the input voltage VIN is a direct current, the inductive current in the inductance L increases generally linearly at a rate that depends on, for example, the value of the inductance L; and energy is stored accordingly in the inductance L. In some embodiments, transistors T1 and T2 are driven by one or more internal blocks 20.

During a discharging process, the boost regulator device 12, through a first driving signal, can turn the first transistor T1 OFF to yield an open circuit between the inductance L and the ground. The boost regulator device 12, through a second driving signal, can turn the second transistor T2 ON to yield a conducting path between the node 18 and the output node 16. In such a configuration, the current flowing through the inductance L decreases from a charged value by being discharged to the capacitance C; accordingly, capacitance C is charged to thereby boost a voltage between two ends of the capacitance C.

The foregoing charging and discharging processes can be repeated to yield a value of the output voltage VOUT that is higher than the input voltage VIN. In the example of FIG. 2, transistors T1 and T2 are utilized to provide their respective switching functionalities. It will be understood that similar switching functionalities can be achieved in other manners. For example diodes can replace either or both of T1 and T2.

In the example of FIG. 2, the output voltage VOUT can be compared with a reference voltage, and depending on the comparison, the driving signals can be adjusted (e.g., pulse width modulation) to adjust the value of VOUT. In some embodiments, such a feedback of VOUT and modulation of the driving signals can be achieved by one or more internal blocks collectively indicated as 20.

In the example of FIG. 2, the node 18 between the inductance L and the first transistor T1 is shown to be connected to an SW (switch) pin of the boost regulator device 12, and the output of the second transistor T2 is shown to be connected to an OUT (output) pin of the boost regulator device 12. Further, a separate IN (input) pin of the boost regulator device 12 is shown to be utilized to provide the input voltage (VIN) (e.g., battery voltage VBAT) to the internal block(s) therein.

In the example of FIG. 2, the boost regulator device 12 can include other pins. For example, pins associated with control and grounding can be provided.

Figure 3:
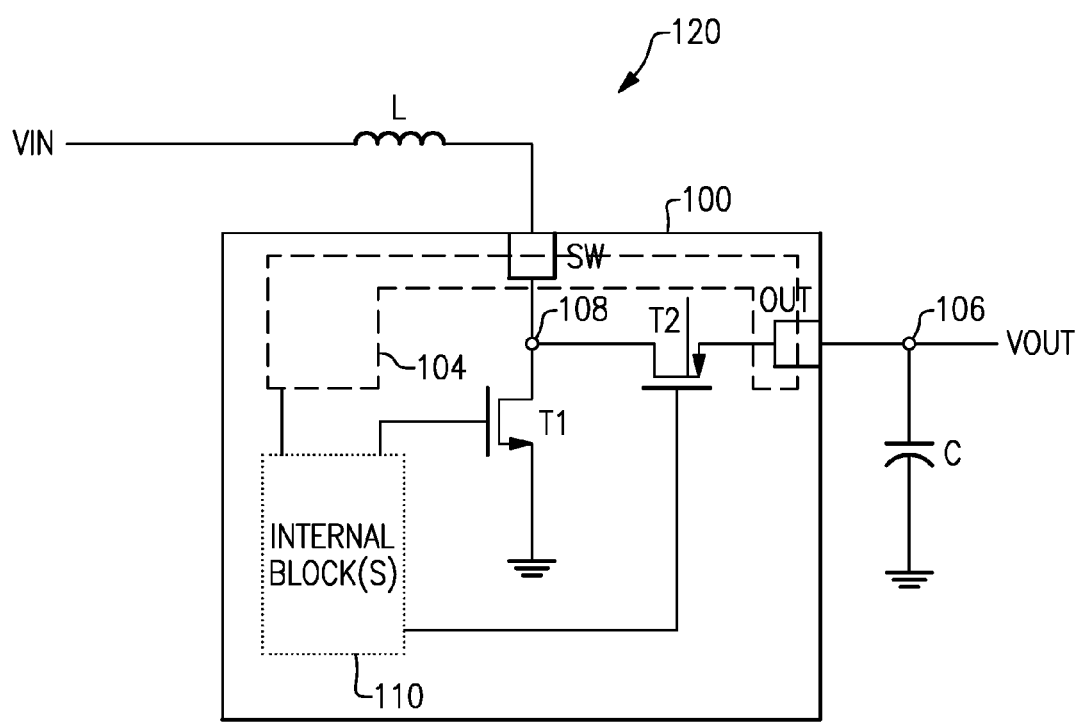
FIG. 3 shows a circuit diagram of a voltage regulator having an internal supply circuit that can allow elimination of the input pin of FIG. 2, while supplying voltage to one or more internal blocks.

FIG. 3 shows an example of a voltage conversion circuit 120 configured to receive an input voltage VIN and generate a converted output voltage VOUT at an output node 106. Such a voltage conversion circuit 120 can include a boost regulator device 100 having switching elements (e.g., transistors) T1 and T2 implemented with respect to a switch (SW) pin and an output (OUT) pin. Operation of such switching elements can be similar to the example of FIG. 2. Similarly, implementation of an inductance L and a capacitance C can be similar to the example of FIG. 2.

In the example of FIG. 3, the boost regulator device 100 is shown to include an internal supply circuit 104 configured to provide a supply voltage to one or more internal blocks collectively indicated as 110. In some embodiments, such an internal supply circuit can replace the functionality associated with the input (IN) pin of the example of FIG. 2, thereby allowing such a pin to be eliminated or not relied on. In many applications, reducing the number of pins in devices such as a boost regulator device can be desirable.

Figure 4:
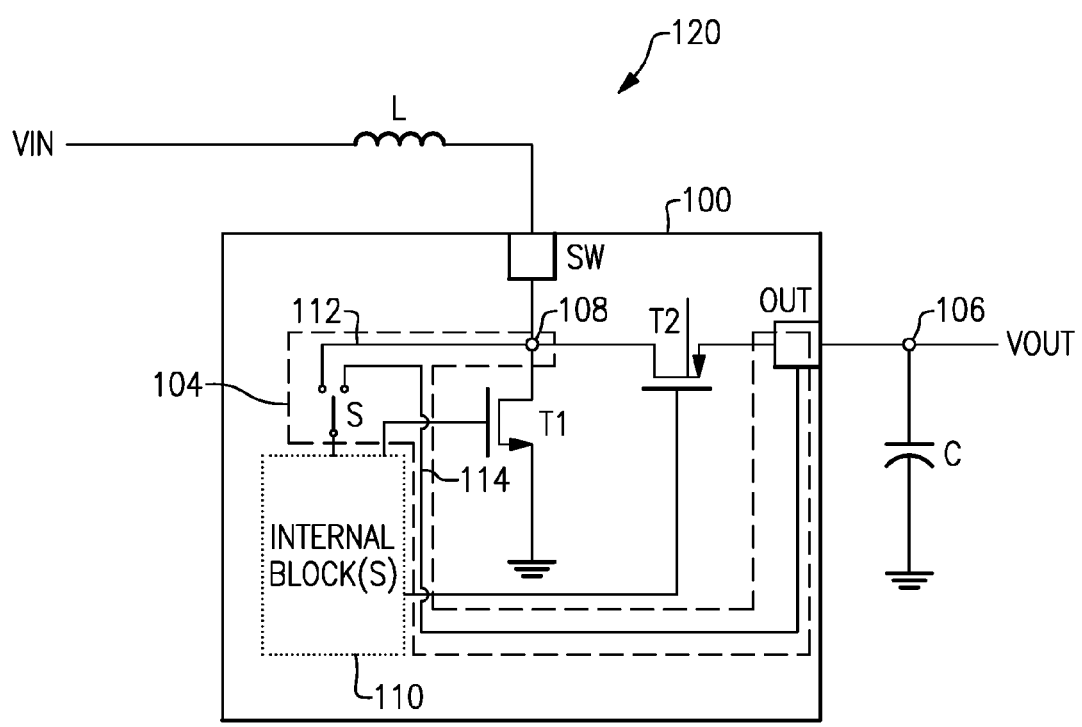
FIG. 4 shows a circuit diagram with the internal supply circuit of the voltage regulator of FIG. 3.

FIG. 4 shows an example of one circuit implementation of the internal supply circuit 104 of FIG. 3. In some embodiments, the internal supply circuit 104 can include a switching circuit configured to provide a voltage from a node associated with a switch (SW) pin or node associated with an output (OUT) pin. In the example shown, such a switching circuit can include a switch S having a pole coupled to a supply node associated with the internal block(s) 110. A first throw of the switch S is shown to be connected (through path 112) to an SW node 108 associated with the SW pin. A second throw of the switch S is shown to be connected (through path 114) to a node associated with the OUT pin. In some embodiments, switch S is referred to as an internal switch, and is located within boost regulator device 100.

Figure 5A:
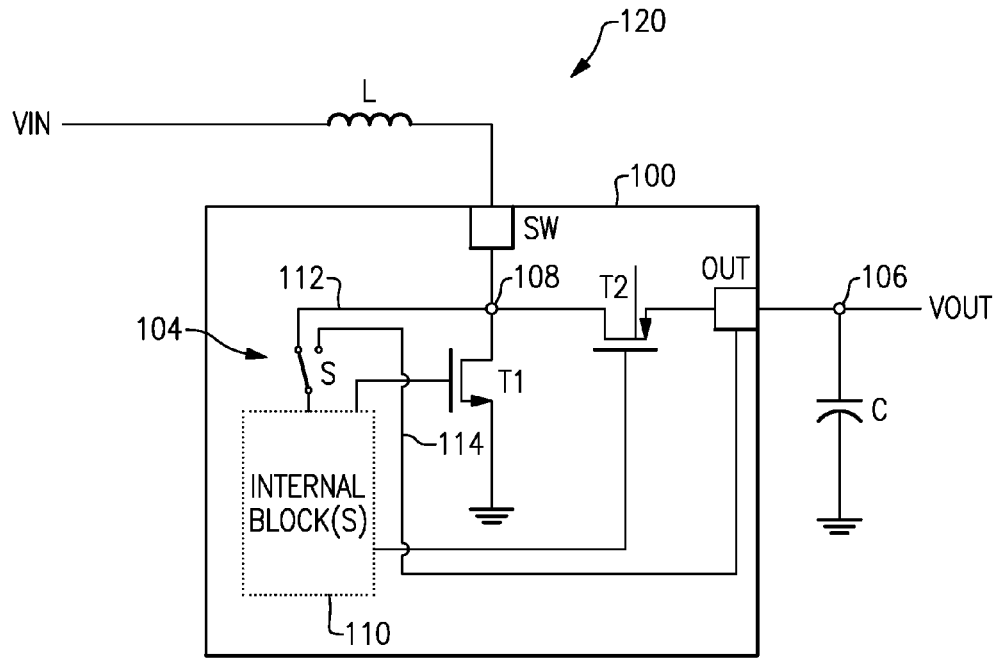
FIG. 5A shows a circuit diagram of supplying voltage to internal blocks of the voltage regulator from a first source.
Figure 5B:
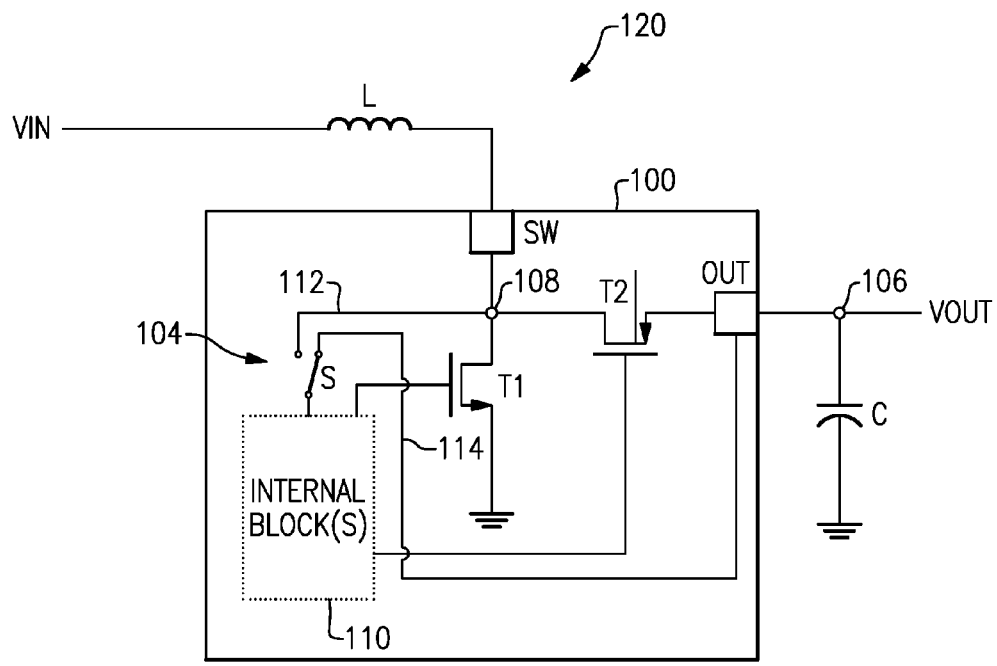
FIG. 5B shows a circuit diagram of supplying voltage to internal blocks of the voltage regulator from a second source.

FIG. 5A shows the internal supply circuit 104 of FIG. 4, in which the switch S is in a state where the pole is connected to the first throw. Accordingly, the supply node associated with the internal block(s) 110 is connected to the SW node 108 associated with the SW pin. FIG. 5B shows the internal supply circuit 104 of FIG. 4, in which the switch S is in a state where the pole is connected to the second throw. Accordingly, the supply node associated with the internal block(s) 110 is connected to the node associated with the OUT pin.

FIG. 5A illustrates that in some embodiments, while switch S is in the state where the pole is connected to the first throw, the boost regulator device 100 is said to be in a pre-charging state. In some embodiments, while the boost regulator device 100 is in the pre-charging state, the input voltage (VIN) supplies the charging of output voltage (VOUT). During this pre-charging state, the boost regulator device 100 is supplying one or more internal blocks 110 with VIN from the SW pin.

FIG. 5B illustrates that in some embodiments, a determination is made by the boost regulator device 100 that VOUT has reached a predefined voltage threshold (e.g., 5 V). In some embodiments, in response to the determination that VOUT has reached a predefined voltage threshold, the boost regulator device 100 disconnects the VOUT node 106 from the Vin supply, as described above with respect to FIG. 2. Additionally, the boost regulator device 100 switches to supplying the one or more internal blocks 110 with VOUT from the OUT pin. In some embodiments, the boost regulator device 100 switches to supplying the internal blocks 110 with VOUT to avoid fluctuations in voltage arising from a connection to the SW pin after VOUT is pre-charged.

In the examples described in reference to FIGS. 4 and 5, the switch S is depicted as having a single-pole-double-throw (SPDT) configuration. It will be understood that such an SPDT switch can be implemented utilizing, for example, transistors. It will also be understood that the switch S can be implemented utilizing other pole/throw configurations.

Figure 6:
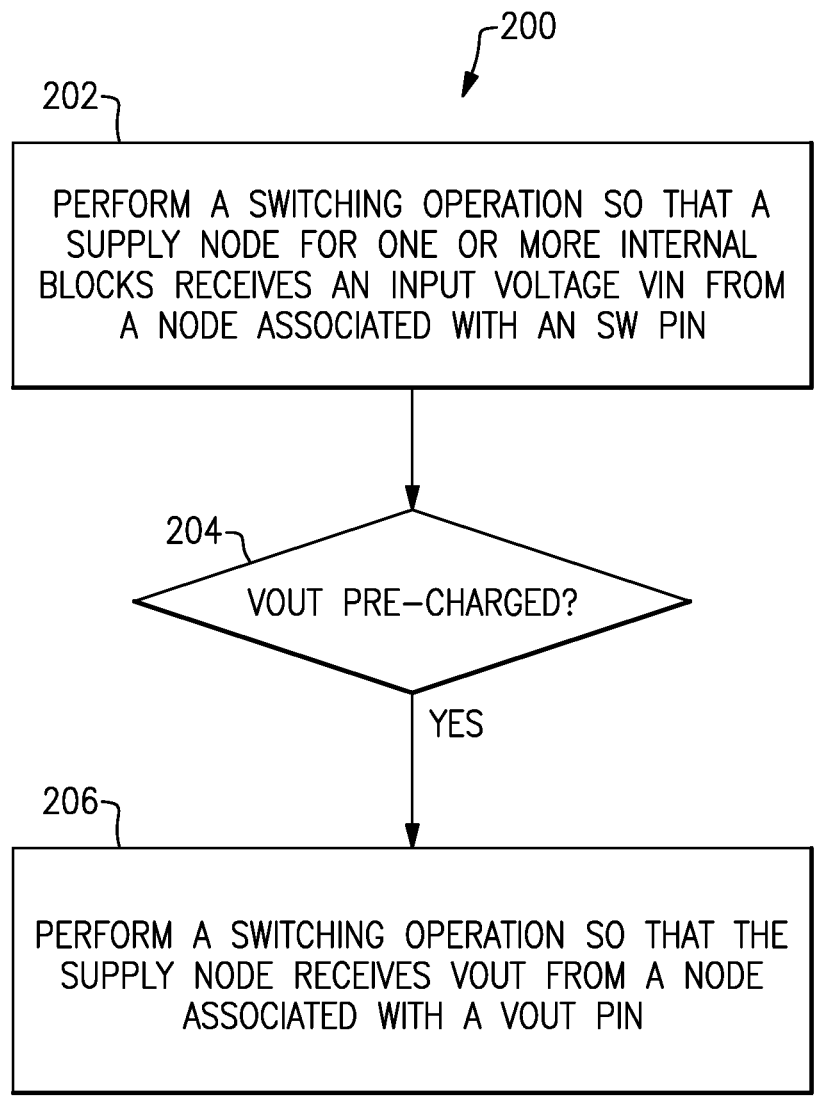
FIG. 6 shows a process that can be implemented to effectuate the switching functionality of FIGS. 5A and 5B.

FIG. 6 shows a process 200 that can be implemented to provide a supply node for one or more internal blocks of a boost regulator device with one or more supply voltages utilizing an internal supply circuit having one or more features as described herein. In block 202, a switch operation can be performed so that the supply node for the internal block(s) can receive an input voltage VIN from a node associated with a switch (SW) pin. In a decision block 204, the process 200 can determine whether an output voltage VOUT is pre-charged. If Yes, the process 200 in block 206 can perform a switching operation so that the supply node for the internal block(s) can receive the output voltage VOUT from a node associated with an output OUT pin. In some implementations, VOUT is pre-charged if it has reached a predefined voltage threshold.

Figure 7:
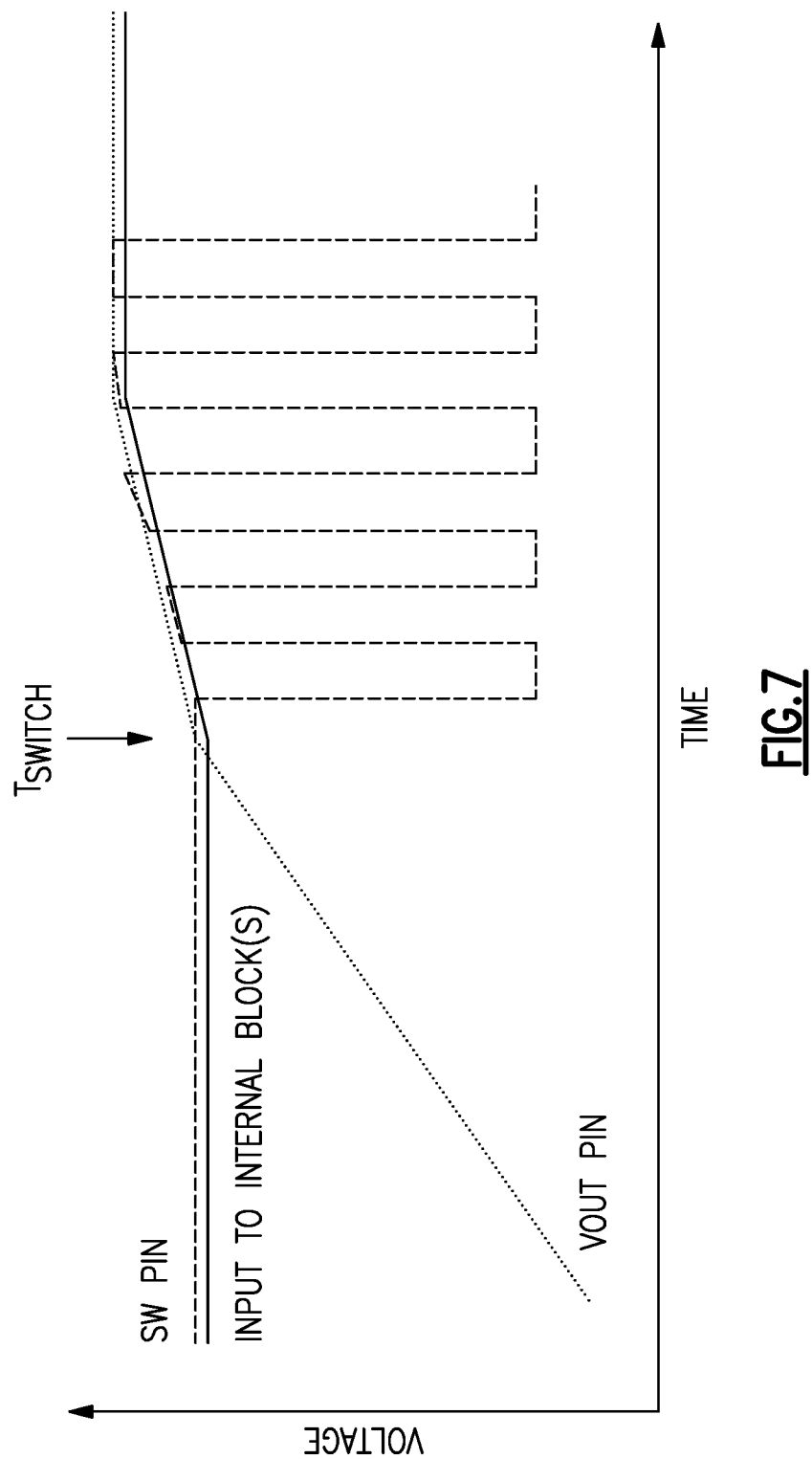
FIG. 7 shows examples of voltage levels associated the internal supply circuit of FIGS. 4-6.

FIG. 7 shows various voltage levels that can be implemented for the example process of FIG. 6. In some embodiments, and referring to FIGS. 4 and 5, a sequence of operations as follows can be implemented. Prior to or substantially at the start of operation of the boost regulator device 100, the SW pin can be connected to the input voltage VIN (e.g., battery voltage VBAT) through the inductance L. Thus, prior to or substantially at the startup of the boost regulator device 100, the internal supply circuit 104 can be in the configuration of FIG. 5A by the operation of block 202 of FIG. 6. Accordingly, in FIG. 7, the voltage at the supply input to the internal block(s) (solid line) is shown to be approximately same as the voltage at the SW pin (dashed line).

The configuration of FIG. 5A (in which the SW pin is connected to the supply node for the internal block(s)) can be maintained as VOUT is pre-charged (e.g., by T1 being turned ON), until the voltage at the OUT pin (dotted line) reaches a selected level. For example, when VOUT exceeds the voltage at the SW pin (at $t_{switch}$ in FIG. 7), the switching operation of block 206 of FIG. 6 can be implemented so as to transition the internal supply circuit 104 from the state of FIG. 5A to the state of FIG. 5B. Accordingly, in FIG. 7, the voltage at the supply input to the internal block(s) is show to be approximately same as the voltage at the OUT pin. In some embodiments, such a configuration can be maintained until the end of operation of the boost regulator device 100.

Figure 8:
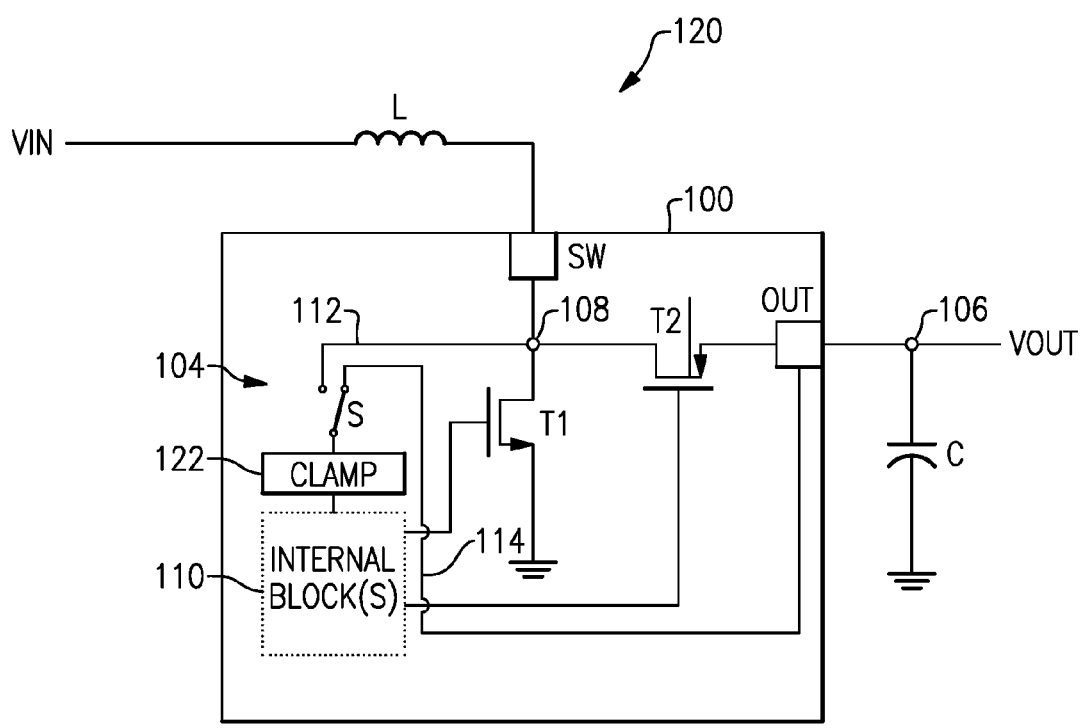
FIG. 8 shows a circuit diagram implementing a clamping circuit to maintain the supply voltage within a desired range.

In the context of a boost regulator, the foregoing output voltage can increase to a desired boosted level by the switching modulation as described herein. Accordingly, the boosted voltage VOUT can be provided to the supply input of the internal block(s). However, there may be applications where the boosted voltage VOUT exceeds a range of operating voltage of the internal block(s). In such a situation, and as shown in FIG. 8, the internal supply circuit 104 can further include a circuit for reducing VOUT to a level that is within the operating voltage range. Such a circuit can be, for example a voltage clamping circuit 122.

Figure 9:
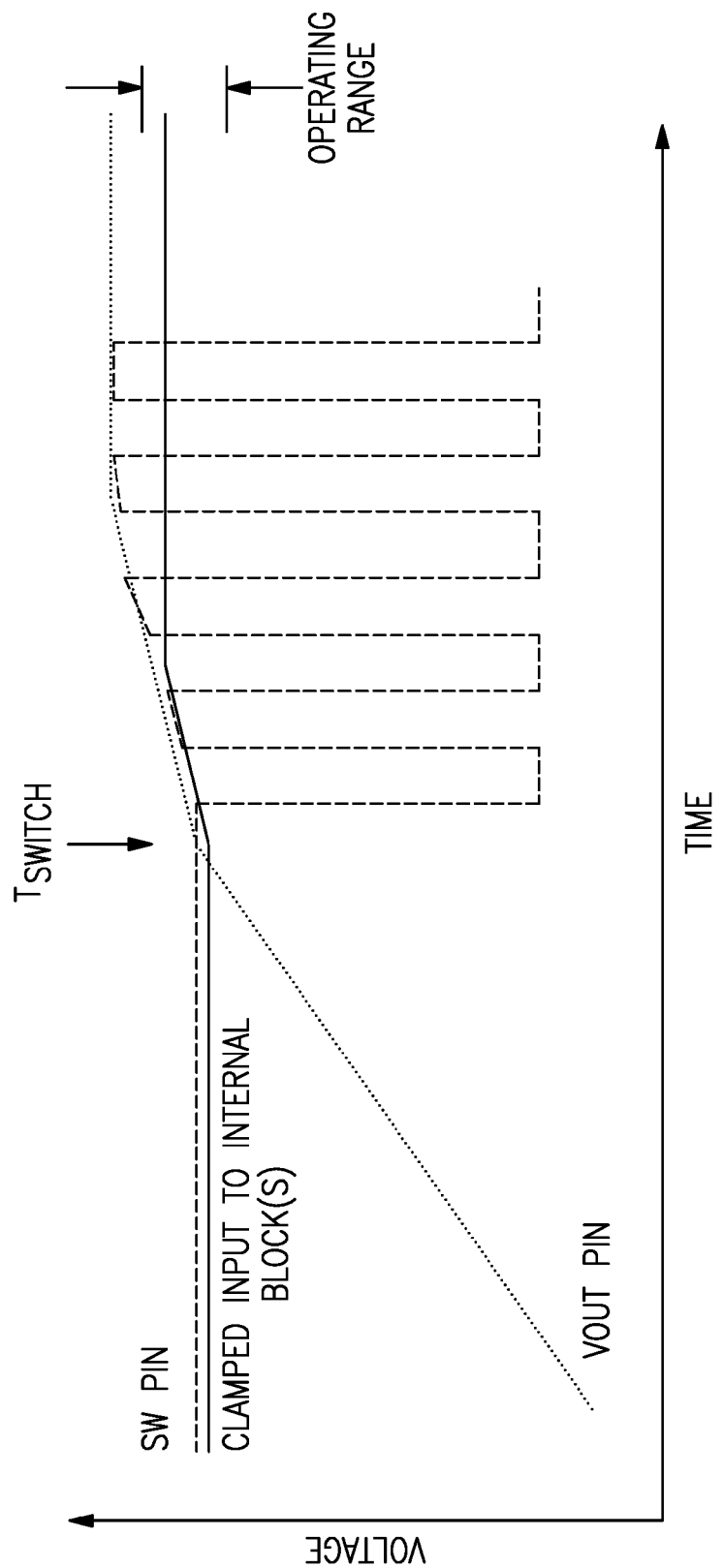
FIG. 9 shows examples of voltage levels associated the internal supply circuit with the clamping circuit of FIG. 8.

FIG. 9 is similar to the example of FIG. 7; however, the clamping circuit 122 of FIG. 8 can be configured to clamp VOUT being provided to the internal block(s) at a level that is lower than the full boosted value. Such a clamped level can be an upper limit of an operating voltage. A lower limit of such an operating range can be at or lower than VIN.

In the examples described herein in reference to FIGS. 3-5 and 8, the boost regulator device 100 is depicted as not having the separate input (IN) pin. As described herein, such a configuration can be desirable due to, for example, reduced number of pins.

Figure 10:
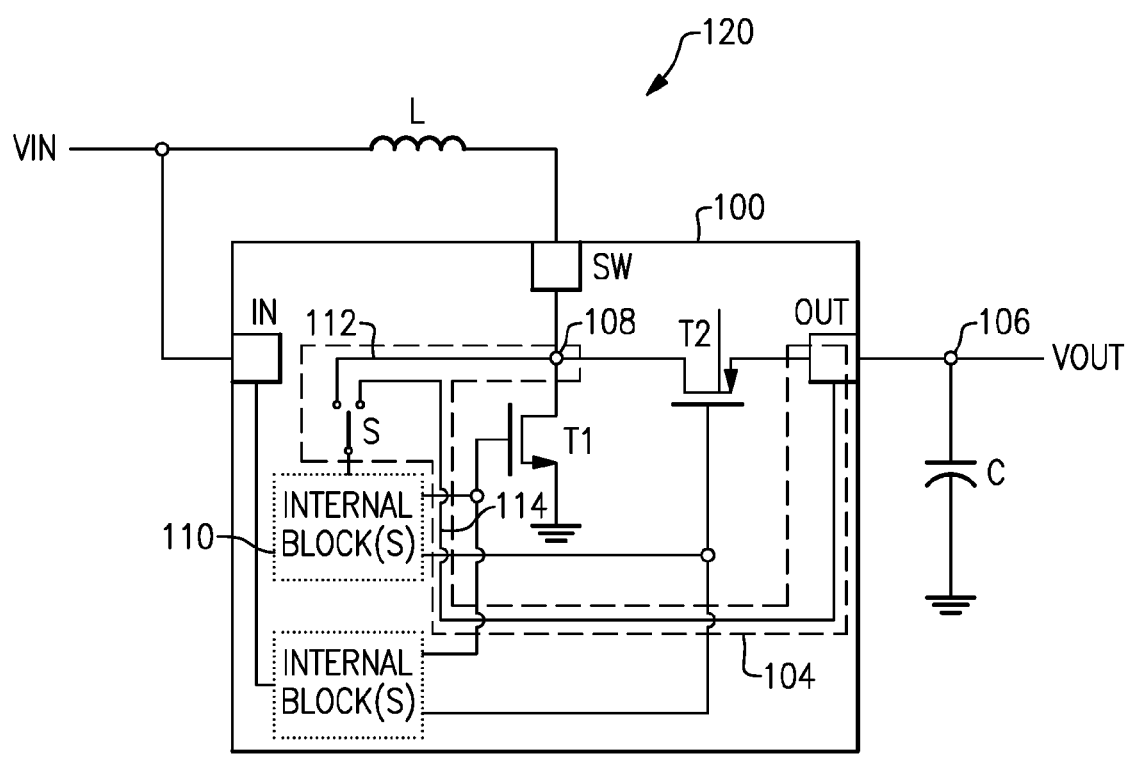
FIG. 10 shows a circuit diagram illustrating that one or more features of the present disclosure can also be implemented in configurations that include an input pin.

FIG. 10 shows that in some embodiments, one or more features of the present disclosure can be implemented in a boost regulator device even if it includes such an input (IN) pin. In the example of FIG. 10, such an IN pin can be connected to some of the internal block(s), and the internal supply circuit 104 can be utilized for the remaining internal block(s).

In the example of FIG. 10, the IN pin is depicted as being utilized for supplying some of the internal block(s). In some embodiments, such an IN pin may exist in a boost regulator device 100 having one or more features as described herein, and not be utilized at all.

Figure 11:
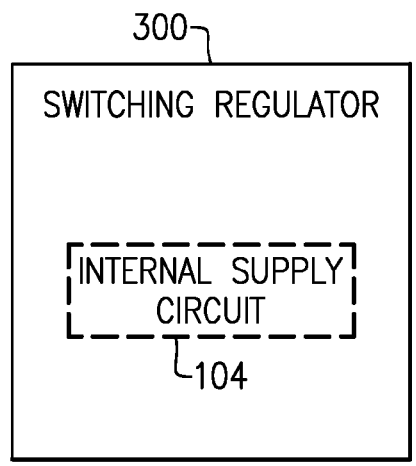
FIG. 11 shows a block diagram of a switching regulator.

FIG. 11 shows that in some embodiments, an internal supply circuit 104 having one or more features as described herein can be implemented in a switching regulator 300. Such a switching regulator can include, for example, a buck regulator, a boost regulator, a buck-boost regulator, etc.

Figure 12:
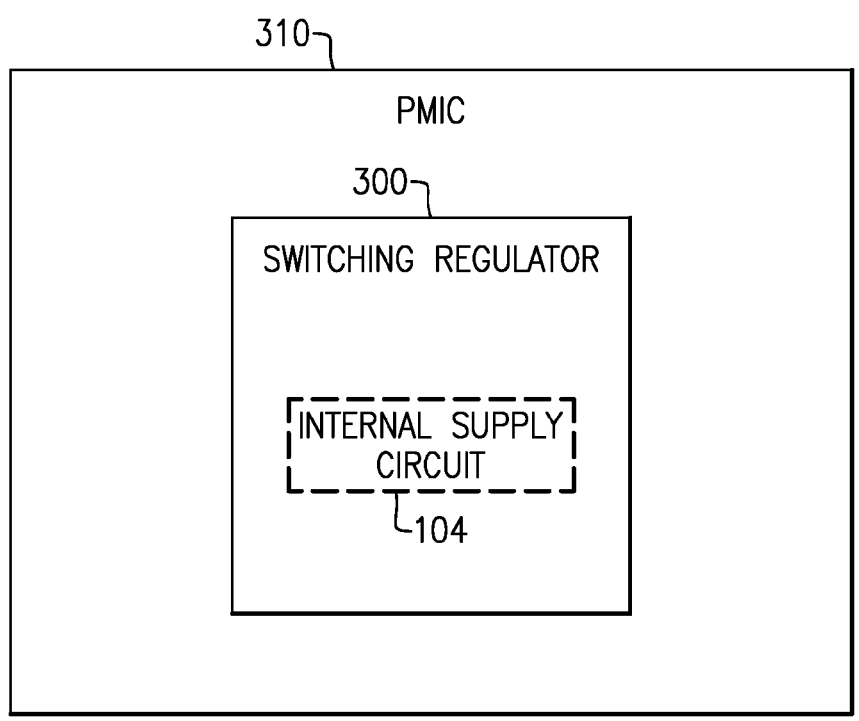
FIG. 12 shows a block diagram of a module such as a power management integrated circuit (PMIC) module.

The switching regulator 300 can be implemented as a standalone discrete device, as part of an integrated circuit (IC) device or system such as a power management integrated circuit (PMIC), and/or any combination thereof. FIG. 12 depicts a PMIC 310 that includes a switching regulator 300. The switching regulator 300 is shown to include an internal supply circuit 104 having one or more features as described herein.

In some embodiments, the PMIC 310 of FIG. 12 can be implemented on a single chip, and can include one or more switching regulators. In some embodiments, such a PMIC can be configured to be used in devices including, for example, wireless devices such as cellular phones, or any devices that utilize switching regulators.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 13:
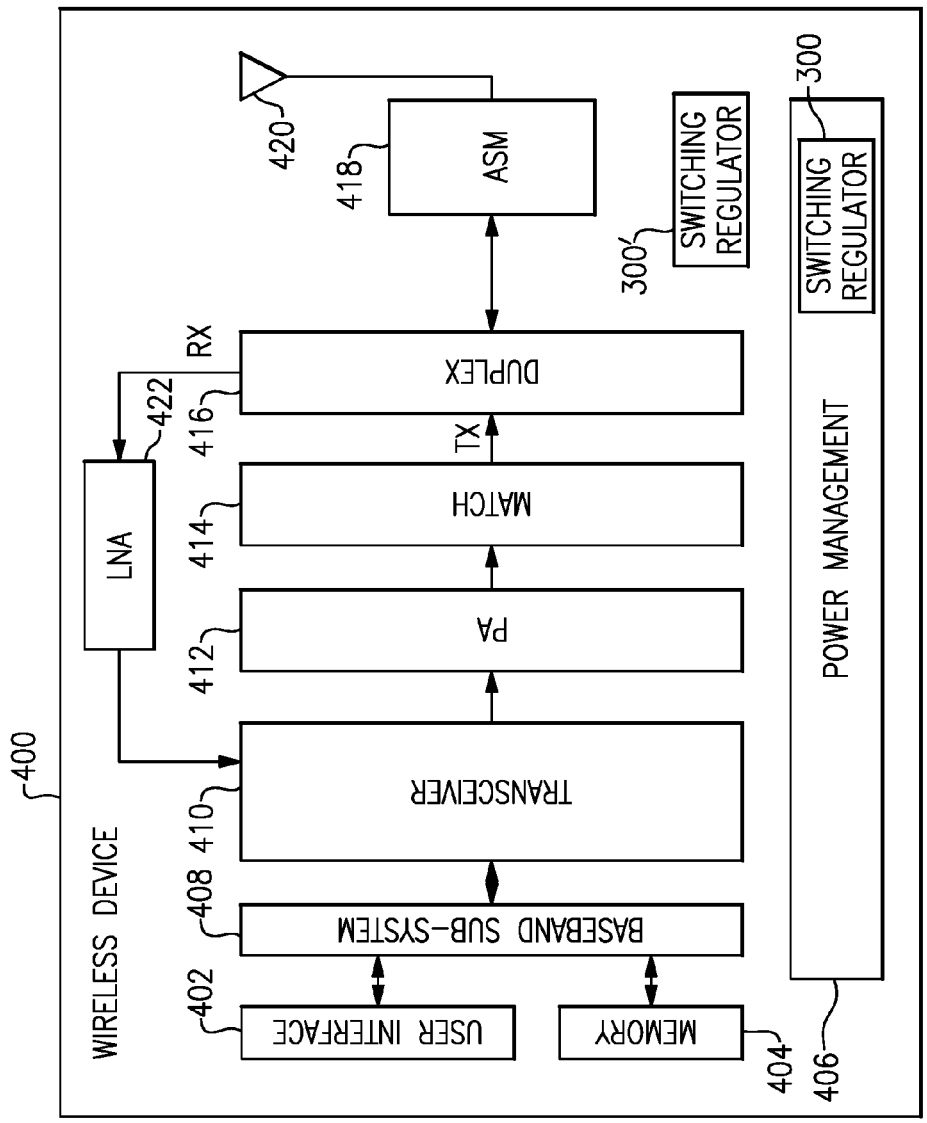
FIG. 13 shows a block diagram of a wireless device implementing one or more switching regulators.

FIG. 13 depicts an example wireless device 400 having one or more advantageous features described herein. In some embodiments, a transceiver 410 can be configured and operated to generate RF signals to be amplified and transmitted, and to process received signals. One or more power amplifiers (PAs) 412 can receive their respective RF signals from the transceiver 410 and amplify such RF signals for transmission. The amplified outputs of the PAs 412 are shown to be matched (via one or more matching circuits 414) and routed to an antenna 420 via their respective duplexer(s) 416 and an antenna switch module (ASM) 418. In some embodiments, some or all of the PAs 412 can be connected to a power management component 406 configured to provide, for example, supply voltages and/or bias signals to the PAs 412.

In some embodiments, the duplexer(s) 416 can allow transmit and receive operations to be performed simultaneously using a common antenna (e.g., 420). In FIG. 13, received signals are shown to be routed to one or more "RX" paths that can include, for example, one or more low-noise amplifiers (LNAs) 422. Received signals amplified by the LNA(s) 422 are shown to be routed to the transceiver 410 for further processing.

In FIG. 13, the transceiver 410 is shown to interact with a baseband sub-system 408 that is configured to provide conversion between data and/or voice signals suitable for a user and RF signals suitable for the transceiver 410. The transceiver 410 is also shown to be connected to the power management component 406 that is configured to manage power for the operation of the wireless device.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example of FIG. 13, the power management component 406 can be implemented as a PMIC that includes a switching regulator 300 having one or more features as described herein. In some embodiments, a switching regulator 300' can also be implemented as a standalone device outside of the PMIC.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage regulator device comprising:
   a regulator circuit implemented between a first pin and a second pin;
   one or more internal blocks configured to be powered through a supply node to facilitate operation of the regulator circuit; and
   an internal supply circuit coupled to the first pin, the second pin, and the supply node, the internal supply circuit configured to provide a supply voltage to the supply node from either or both of the first and second pins.

2. The voltage regulator device of claim 1 wherein the first pin includes a switch (SW) pin, and the second pin includes an output (OUT) pin.

3. The voltage regulator device of claim 2 wherein the regulator circuit includes a first switch implemented between a node associated with the SW pin and ground, and a second switch implemented between the node associated with the SW pin and a node associated with the OUT pin.

4. The voltage regulator device of claim 3 wherein the SW pin is configured to be connected to an input voltage VIN through an inductance L.

5. The voltage regulator device of claim 4 wherein the inductance L includes an inductor that is substantially external to the voltage regulator device.

6. The voltage regulator device of claim 4 wherein the input voltage includes a battery voltage VBAT.

7. The voltage regulator device of claim 3 wherein the OUT pin is configured to be coupled to ground through a capacitance C.

8. The voltage regulator device of claim 7 wherein the capacitance C includes a capacitor that is substantially external to the voltage regulator device.

9. The voltage regulator device of claim 3 wherein the internal supply circuit includes a switchable connection configured to connect the supply node to the node associated with the SW pin or the node associated with the OUT pin.

10. The voltage regulator device of claim 9 wherein the switchable connection includes a single-pole-double-throw (SPDT) switch having the pole connected to the supply node and the two throws connected to the nodes associated with the SW and OUT pins.

11. The voltage regulator device of claim 9 wherein the voltage regulator device is configured as a boost regulator.

12. The voltage regulator device of claim 11 wherein the switchable connection is configured to connect the node associated with the SW pin with the supply node prior to and during a phase where an output voltage VOUT is being pre-charged.

13. The voltage regulator device of claim 12 wherein the switchable connection is further configured to connect the node associated with the OUT pin with the supply node when the output voltage VOUT reaches a value that is substantially at an input voltage VIN at the SW pin.

14. The voltage regulator device of claim 13 wherein the input voltage VIN is approximately equal to a battery voltage VBAT.

15. The voltage regulator device of claim 13 wherein a transition of the switchable connection from the node associated with the SW pin to the node associated with the OUT pin is configured to occur at or near commencement of a switched mode operation to boost the value of VOUT.

16. The voltage regulator device of claim 15 wherein the internal supply circuit further includes a clamp circuit configured to reduce the value of a voltage provided to the supply node if the voltage exceeds an upper limit of a desired range.

17. The voltage regulator device of claim 3 wherein the voltage regulator device is substantially free of a separate input supply (IN) pin for supplying power to the supply node of the one or more internal blocks.

18. A method for regulating voltage, the method comprising:
   providing a regulator circuit between a first pin and a second pin;
   operating the regulator circuit with one or more internal blocks of the regulator circuit powered through a supply node within the regulator circuit; and
   powering the one or more internal blocks by supplying voltage from either or both of the first and second pins to the supply node using an internal supply circuit coupled to the first pin, the second pin, and the supply node.

19. The method of claim 18 wherein the powering of the one or more internal blocks is achieved substantially without use of a separate input supply (IN) pin.

20. A wireless device comprising:
   a transceiver;
   a power amplifier (PA) configured to amplify a transmit (Tx) radio-frequency signal from the transceiver;
   a low-noise amplifier (LNA) configured to amplify a receive (Rx) RF signal for processing by the transceiver;
   an antenna switch module (ASM) configured to route the Tx RF signal and the Rx RF signal; and
   a power management module configured to manage power associated with at least some of the transceiver, the PA, the LNA, and the ASM, the power management module including a voltage regulator device having a regulator circuit implemented between a first pin and a second pin, the voltage regulator device further including one or more internal blocks configured to be powered through a supply node to facilitate operation of the regulator circuit, the voltage regulator device further including an internal supply circuit coupled to the first pin, the second pin, and the supply node, the internal supply circuit configured to provide a supply voltage to the supply node from either or both of the first and second pins.

\* \* \* \* \*